United States Patent
Shaw

(10) Patent No.: US 9,778,426 B2
(45) Date of Patent: Oct. 3, 2017

(54) ELECTRO-OPTIC DEVICE WITH DICHROIC MIRROR AND RELATED METHODS

(71) Applicant: STMICROELECTRONICS S.R.L., Agrate Brianza (IT)

(72) Inventor: Mark Andrew Shaw, Milan (IT)

(73) Assignee: STMICROELECTRONICS S.R.L., Agrate Brianza (MB) (IT)

( * ) Notice: Subject to any disclaimer, the term of this patent is extended or adjusted under 35 U.S.C. 154(b) by 0 days.

(21) Appl. No.: 15/296,089

(22) Filed: Oct. 18, 2016

(65) Prior Publication Data
US 2017/0038540 A1 Feb. 9, 2017

Related U.S. Application Data

(62) Division of application No. 14/722,565, filed on May 27, 2015, now Pat. No. 9,488,789.

(51) Int. Cl.
| | |
|---|---|
| G02B 6/42 | (2006.01) |
| G02B 6/34 | (2006.01) |
| G02B 6/124 | (2006.01) |
| G02B 6/30 | (2006.01) |
| G02B 6/32 | (2006.01) |
| G02B 27/14 | (2006.01) |
| B29C 65/02 | (2006.01) |
| B29C 65/48 | (2006.01) |
| B29L 11/00 | (2006.01) |
| G02B 6/12 | (2006.01) |

(52) U.S. Cl.
CPC ............ *G02B 6/4215* (2013.01); *B29C 65/02* (2013.01); *G02B 6/124* (2013.01); *G02B 6/30* (2013.01); *G02B 6/32* (2013.01); *G02B 6/34* (2013.01); *G02B 6/4214* (2013.01); *G02B 6/4253* (2013.01); *G02B 27/141* (2013.01); *B29C 65/48* (2013.01); *B29L 2011/00* (2013.01); *G02B 2006/12038* (2013.01)

(58) Field of Classification Search
CPC ........ G02B 27/141; G02B 6/124; G02B 6/30; G02B 6/32; G02B 6/34; G02B 6/4214; G02B 6/4253; G02B 6/4215; G02B 27/41; G02B 2006/12038; B29C 65/02; B29C 65/48; B29L 2011/00
See application file for complete search history.

(56) References Cited

U.S. PATENT DOCUMENTS

| | | |
|---|---|---|
| 5,287,424 A | 2/1994 | Sheem et al. |
| 5,902,715 A | 5/1999 | Tsukamoto et al. |
| 6,017,681 A | 1/2000 | Tsukamoto et al. |

(Continued)

OTHER PUBLICATIONS

Bosman et al. Assembly of Optoelectronics for Efficient Chip-to-Waveguide Coupling, 2013 IEEE 15th Electronics Packaging Technology Conference (EPTC 2013).*

(Continued)

*Primary Examiner* — Peter Radkowski
(74) *Attorney, Agent, or Firm* — Slater Matsil, LLP

(57) ABSTRACT

An electro-optic device may include a photonic chip having an optical grating at a surface, and an IC coupled to the photonic chip. The electro-optic device may include an optical element defining an optical path above the optical grating, and a dichroic mirror above the optical grating and aligned with the optical path.

19 Claims, 3 Drawing Sheets

(56) References Cited

U.S. PATENT DOCUMENTS

| | | | |
|---|---|---|---|
| 6,081,632 A | 6/2000 | Yoshimura et al. | |
| 6,213,651 B1 | 4/2001 | Jiang et al. | |
| 6,419,749 B1* | 7/2002 | Rhoades | B05D 3/067 |
| | | | 118/620 |
| 6,946,785 B2* | 9/2005 | Ito | B82Y 30/00 |
| | | | 252/301.4 R |
| 6,959,133 B2* | 10/2005 | Vancoill | G02B 6/4204 |
| | | | 385/140 |
| 7,014,988 B2 | 3/2006 | DeVoe et al. | |
| 7,166,322 B2* | 1/2007 | Inui | B29D 11/00663 |
| | | | 427/163.2 |
| 7,194,016 B2* | 3/2007 | Bullington | G02B 6/34 |
| | | | 372/108 |
| 7,283,695 B2* | 10/2007 | Gaylord | G02B 6/02085 |
| | | | 385/14 |
| 7,369,725 B2 | 5/2008 | Takatori et al. | |
| 7,374,328 B2 | 5/2008 | Kuroda et al. | |
| 7,413,355 B2 | 8/2008 | Nishizawa et al. | |
| 7,553,059 B2 | 6/2009 | Kuroda et al. | |
| 7,560,055 B2 | 7/2009 | Inui et al. | |
| 7,601,484 B2 | 10/2009 | DeVoe et al. | |
| 7,656,472 B2 | 2/2010 | Takatori et al. | |
| 8,283,678 B2* | 10/2012 | Morioka | G02B 6/4214 |
| | | | 257/82 |
| 8,315,492 B2* | 11/2012 | Chen | G02B 6/4206 |
| | | | 385/33 |
| 8,457,457 B2* | 6/2013 | Morioka | G02B 6/4206 |
| | | | 385/33 |
| 8,530,118 B2* | 9/2013 | DeVoe | G02B 6/1221 |
| | | | 385/143 |
| 9,201,200 B2* | 12/2015 | Bowen | G02B 6/30 |
| 9,252,321 B2 | 2/2016 | Goto | |
| 2004/0165637 A1* | 8/2004 | Bullington | G02B 6/34 |
| | | | 372/50.11 |
| 2004/0212290 A1* | 10/2004 | Ito | B82Y 30/00 |
| | | | 313/479 |
| 2005/0058420 A1* | 3/2005 | Inui | B29D 11/00663 |
| | | | 385/129 |
| 2005/0141823 A1* | 6/2005 | Han | G02B 6/4204 |
| | | | 385/89 |
| 2005/0147353 A1* | 7/2005 | Vancoill | G02B 6/4204 |
| | | | 385/47 |
| 2005/0208431 A1 | 9/2005 | DeVoe et al. | |
| 2005/0276545 A1 | 12/2005 | Inui et al. | |
| 2006/0067617 A1* | 3/2006 | Gaylord | G02B 6/02085 |
| | | | 385/37 |
| 2006/0078831 A1 | 4/2006 | DeVoe et al. | |
| 2006/0280411 A1 | 12/2006 | Nishizawa et al. | |
| 2007/0058388 A1* | 3/2007 | Takatori | G02B 6/001 |
| | | | 362/554 |
| 2007/0236940 A1 | 10/2007 | Kuroda et al. | |
| 2008/0055929 A1 | 3/2008 | Kuroda et al. | |
| 2008/0108122 A1 | 5/2008 | Paul et al. | |
| 2008/0285914 A1 | 11/2008 | Matsuoka et al. | |
| 2008/0304791 A1 | 12/2008 | Takatori et al. | |
| 2010/0027956 A1* | 2/2010 | DeVoe | G02B 6/1221 |
| | | | 385/142 |
| 2010/0098374 A1 | 4/2010 | Althaus | |
| 2010/0272403 A1* | 10/2010 | Chen | G02B 6/4206 |
| | | | 385/93 |
| 2010/0278484 A1 | 11/2010 | Scheerlinck et al. | |
| 2010/0295063 A1* | 11/2010 | Morioka | G02B 6/4206 |
| | | | 257/80 |
| 2011/0057204 A1* | 3/2011 | Morioka | G02B 6/4214 |
| | | | 257/84 |
| 2012/0120365 A1 | 5/2012 | Legerton et al. | |
| 2013/0163919 A1* | 6/2013 | Cho | G02B 6/12 |
| | | | 385/14 |
| 2013/0223788 A1 | 8/2013 | Koos et al. | |
| 2014/0029894 A1* | 1/2014 | Bowen | G02B 6/30 |
| | | | 385/37 |
| 2014/0071426 A1* | 3/2014 | Dunne | G01S 7/481 |
| | | | 356/4.01 |
| 2014/0193115 A1* | 7/2014 | Popovic | G02B 6/124 |
| | | | 385/14 |
| 2015/0087092 A1 | 3/2015 | Goto | |

OTHER PUBLICATIONS

Luff et al., "Research Article—Hybrid Silicon Photonics for Low-Cost High-Bandwidth Link Applications," Advances in Optical Technologies, vol. 2008, Mar. 27, 2008, 6 pages See Priority U.S. Appl. No. 14/722,565, filed May 27, 2015.

Barwicz et al., "Assembly of Mechanically Compliant Interfaces Between Optical Fibers and Nanophotonic Chips," IEEE 64th ECTC, May 27-30, 2014, pp. 1-14 See Priority U.S. Appl. No. 14/722,565, filed May 27, 2015.

Li et al., "Silicon Photonics Packaging With Lateral Fiber Coupling to Apodized Grating Coupler Embedded Circuit," Optics Express, vol. 22, No. 20, Oct. 6, 2014, pp. 24235-24240 See Priority U.S. Appl. No. 14/722,565, filed May 27, 2015.

Han et al., "A Reflective Curved Mirror With Low Coupling Loss for Optical Interconnection," IEEE Photonics Technology Letters, vol. 16, No. 1, Jan. 2004, pp. 185-187 See Priority U.S. Appl. No. 14/722,565, filed May 27, 2015.

Hirmatsu et al., "Surface Mount Connectors With Three-Dimensional Waveguide Arrays for Board-to-Board Optical Interconnects," ECOC 2005 Proceedings, vol. 3, pp. 615-616 See Priority U.S. Appl. No. 14/722,565, filed May 27, 2015.

Clark et al., "Flexible Polymer Waveguides for Optical Wire Bonds," Journal of Optics A: Pure and Applied Optics, 2002, pp. S224-S227 See Priority U.S. Appl. No. 14/722,565, filed May 27, 2015.

Fischer et al., "Topical Review—Unconventional Applications of Wire Bonding Create Opportunities for Microsystem Integration," Journal of Micromechanics and Microengineering 23, 2013, pp. 1-18 See Priority U.S. Appl. No. 14/722,565, filed May 27, 2015.

Lindenmann et al., "Broadband Low-Loss Interconnects Enabled by Photonic Wire Bonding," IEEE 2012, pp. 125-126 See Priority U.S. Appl. No. 14/722,565, filed May 27, 2015.

Lindenmann et al., "Low-Loss Photonic Wire Bond Interconnects Enabling 5 TBit/s Data Transmission," Optical Society of America, Jan. 23, 2012, pp. 1-3 See Priority U.S. Appl. No. 14/722,565, filed May 27, 2015.

Lindenmann et al., "Photonic Wire Bonding for Single-Mode Chip-to-Chip Interconnects," IEEE 2011, pp. 380-382 See Priority U.S. Appl. No. 14/722,565, filed May 27, 2015.

Lindenmann et al., "Photonic Waveguide Bonds—A Novel Concept for Chip-to-Chip Interconnects," Optical Society of America, 2011, 3 pages See Priority U.S. Appl. No. 14/722,565, filed May 27, 2015.

Hiramatsu, "Compact Waveguide Array Connectors for Optical Backplane System," Mitsubishi Electric Corporation Advanced Technology R&D Center, Mar. 11, 2009, 2 pages See Priority U.S. Appl. No. 14/722,565, filed May 27, 2015.

Lee et al., "Perpendicular Coupling to In-Plane Photonics Using Arc Waveguides Fabricated Via Two-Photon Polyermization," Applied Physics Letters 100, 2012, 4 pages See Priority U.S. Appl. No. 14/722,565, filed May 27, 2015.

Lamprecht et al., "Integrated Micro-Mirrors for Compact Routing of Optical Polymer Waveguides," LEOS Annua Meeting Conference Proceedings, IEEE 2009, pp. 20-21 See Priority U.S. Appl. No. 14/722,565, filed May 27, 2015.

Hiramatsu et al., "Compact Three-Dimensional Waveguide Array Connectors for Extremely High-Definition (EHD) Display System," IEEE Conference Publications, 2006, pp. 1-2 See Priority U.S. Appl. No. 14/722,565, filed May 27, 2015.

Zakariya et al., "Flexible Waveguide Coupling Probe for Wafer-Level Optical Characterization of Planar Lightwave Circuits," IEEE 2007, pp. 458-461 See Priority U.S. Appl. No. 14/722,565, filed May 27, 2015.

Fujiwara et al., "High Performance Polynorbornene Optical Waveguide for Opto-Electric Interconnections," IEEE Polytronic 2007 Conference, 2007, pp. 193-197 See Priority U.S. Appl. No. 14/722,565, filed May 27, 2015.

(56) References Cited

OTHER PUBLICATIONS

Hiramatsu, "Optical Backplane Connectors Using Three-Dimensional Waveguide Arrays," Journal of Lightwave Technology, vol. 25, No. 9, Sep. 2007, pp. 2776-2782 See Priority U.S. Appl. No. 14/722,565, filed May 27, 2015.

Immonen et al, "Fabrication and Characterization of Polymer Optical Waveguides With Integrated Micromirrors for Three-Dimensional Board-Level Optical Interconnects," IEEE Transactions on Electronics Packaging Manufacturing, vol. 28, No. 4, Oct. 2005, pp. 304-311 See Priority U.S. Appl. No. 14/722,565, filed May 27, 2015.

Koos, "Silicon Nanophotonics and Photonic Wire Bonding: Technologies for Multi-Terabit/s Interconnects," Institute of Photonics and Quantum Electronics, Mar. 3, 2012, pp. 1-27 See Priority U.S. Appl. No. 14/722,565, filed May 27, 2015.

McLeod et al., "3D Waveguides With Fiber Couples and 90 Degree Bends in Holographic Photopolymer," Proc. of SPIE vol. 6657, 2007, pp. 1-6 See Priority U.S. Appl. No. 14/722,565, filed May 27, 2015.

"4-Channel Optical Transceiver Applying 3-Dimensional Polymeric Waveguide," Find vol. 24, 2006, pp. 1-5 See Priority U.S. Appl. No. 14/722,565, filed May 27, 2015.

Houbertz et al., "Optoelectronic Printed Circuit Board: 3D Structures Written by Two-Photon Absorption," Proceedings of the SPIE—The International Society for Optical Engineering, v 7053, 2008, pp. 1-13 See Priority U.S. Appl. No. 14/722,565, filed May 27, 2015.

Houbertz et al., "Two-Photon Polymerization of Inorganic-Organic Hybrid Polymers as Scalable Technology Using Ultra-Short Laser Pulses," Coherence and Ultrashort Pulse Laser Emission, Dec. 24, 2010, pp. 583-608 See Priority U.S. Appl. No. 14/722,565, filed May 27, 2015.

Lindenmann et al., Photonic Wire Bonds for Terabit/s Chip-to-Chip Interconnects, Optics Express 20(16), 2012, p. 1-8 See Priority U.S. Appl. No. 14/722,565, filed May 27, 2015.

Hiramatsu et al., "Three-Dimensional Waveguide Arrays for Coupling Between Fiber-Optic Connectors and Surface-Mounted Optoelectronic Devices," Journal of Lightwave Technology, vol. 23, No. 9, Sep. 2005, pp. 2733-2739 See Priority U.S. Appl. No. 14/722,565, filed May 27, 2015.

Riester, "Chip-to-Board Interconnects for High-Performance Computing," SPIE Photonics West 8630, Feb. 3, 2013, pp. 1-12 See Priority U.S. Appl. No. 14/722,565, filed May 27, 2015.

Ogura, Polysilane-Based Multi-Layered Waveguide for Optical Interconnect, Techno-Cosmos, vol. 21, Mar. 2008, pp. 15-21 See Priority U.S. Appl. No. 14/722,565, filed May 27, 2015.

Stadlmann et al., "Fabrication of Optical Interconnects With Two Photon Polymerization," Proceedings of MPM2010—The 11th International Symposium on Laser Precision Microfabrication, Aug. 24, 2010, pp. 1-6 See Priority U.S. Appl. No. 14/722,565, filed May 27, 2015.

Van Steenberge et al., "MT-Compatible Laser-Ablated Interconnections for Optical Printed Circuit Boards," Journal of Lightwave Technology, vol. 22, No. 9, Sep. 2004, pp. 2083-2090 See Priority U.S. Appl. No. 14/722,565, filed May 27, 2015.

Schmidt et al., "Two-Photon 3D Lithography: A Versatile Fabrication Method for Complex 3D Shapes and Optical Interconnects Within the Scope of Innovative Industrial Application," JLMN—Journal of Laser Micro/Nanoengineering, vol. 2, No. 3, 2007, pp. 170-177 See Priority U.S. Appl. No. 14/722,565, filed May 27, 2015.

Zakariya et al., "Experimental Demonstration of a Wafer-Level Flexible Probe for Optical Waveguide Testing," Optics Express, vol. 15, No. 24, Nov. 26, 2007, pp. 16210-16215 See Priority U.S. Appl. No. 14/722,565, filed May 27, 2015.

Itoh et al., "Fabricating Micro-Bragg Reflectors in 3-D Photorefractive Waveguides," Optics Express, vol. 2, No. 12, Jun. 8, 1998, pp. 503-508 See Priority U.S. Appl. No. 14/722,565, filed May 27, 2015.

Kim et al., "Stacked Polymeric Multimode Waveguide Arrays for Two-Dimensional Optical Interconnects," Journal of Lightwave Technology, vol. 22, No. 3, Mar. 2004, pp. 840-844 See Priority U.S. Appl. No. 14/722,565, filed May 27, 2015.

Panepucci et al., "Polymeric Optical Wire-Bonding for Planar Lightwave Circuit Packaging," Conference Paper—Integrated Photonics and Nanophotonics Research and Applications, Jul. 13-16, 2008, 3 pages See Priority U.S. Appl. No. 14/722,565, filed May 27, 2015.

McLeod et al., "Hybrid Integrated Optics in Volume Holographic Photopolymer," Proceedings of SPIE, vol. 5521, 2004, pp. 55-62 See Priority U.S. Appl. No. 14/722,565, filed May 27, 2015.

"Skin Tight Electronics," Fraunhofer Vue Microelectronics News 35, Jul. 2009, pp. 1-28 See Priority U.S. Appl. No. 14/722,565, filed May 27, 2015.

Houbertz et al., "Hybrid Polymer Optical Waveguides Written by Two-Photon Processing for 3D Interconnects," Opto, Paper 8630-8, Feb. 3, 2013, 23 pages See Priority U.S. Appl. No. 14/722,565, filed May 27, 2015.

Ogura et al., "Polysilane-Bsed 3D Waveguides for Optical Interconnects," Proc. of SPIE, vol. 6891, 2008, pp. 1-11 See Priority U.S. Appl. No. 14/722,565, filed May 27, 2015.

Panepucci et al., "Flexible Optical Wire-Bonding for Planar Lightwave Circuits Packaging," Proc. of SPIE, vol. 6645, 2007, pp. 1-8 See Priority U.S. Appl. No. 14/722,565, filed May 27, 2015.

Karp et al., Planar micro-optic solar concentration using multiple imaging lenses into a common slab waveguide, SPIE, San Diego, 2009 See Priority U.S. Appl. No. 14/722,565, filed May 27, 2015.

Jeong et al., "Biologically inspired artificial compund eyes", Science 312, 557 (2006) See Priority U.S. Appl. No. 14/722,565, filed May 27, 2015.

\* cited by examiner

ELECTRO-OPTIC DEVICE WITH DICHROIC MIRROR AND RELATED METHODS

CROSS REFERENCE TO RELATED APPLICATIONS

This application is a divisional application of pending U.S. patent application Ser. No. 14/722,565 filed May 27, 2015, which is hereby incorporated herein in its entirety by reference.

TECHNICAL FIELD

The present disclosure relates to the field of photonics, and, more particularly, to an electro-optic device and related methods.

BACKGROUND

Integrated optical devices for directly processing optical signals have become of greater importance as optical fiber communications increasingly replace metallic cable and microwave transmission links. Integrated optical devices can advantageously be implemented as silica optical circuits having compact dimensions at relatively low cost. Silica optical circuits employ integrated waveguide structures formed on silicon substrates.

In some applications, optical gratings are formed in the silicon substrate or chip for input-output of the photonic signal. Typically, the optical grating is formed on a major surface of the silicon substrate. Hence, the photonic signal path extends largely perpendicular to the silicon substrate. When using the silicon substrate in coupling applications, such as when coupling to an optical fiber, the optical fiber must be mounted in near perpendicular fashion. In these applications, the side profile of the coupling device can be quite large, which is generally undesirable. Indeed, since optical fibers have a minimum bending radius, the side profile of the device can be substantially impacted.

SUMMARY

Generally speaking, an electro-optic device may include a photonic chip having an optical grating at a surface thereof, an integrated circuit (IC) coupled to the photonic chip, and an optical element defining an optical path above the optical grating. The electro-optic device may include a dichroic mirror above the optical grating and aligned with the optical path.

In some embodiments, the optical element may comprise an optical fiber extending parallel with the optical grating. In other embodiments, the optical element may comprise a lens, for example, a collimating lens or a focusing lens.

Also, the electro-optic device may further comprise a polymer material encapsulating the optical element and the dichroic mirror. The polymer material may comprise a photopolymer configured to cure responsive to a first wavelength of electromagnetic radiation. The photonic chip may operate at a second wavelength of electromagnetic radiation, and the dichroic mirror may reflect the second wavelength of electromagnetic radiation and transmit the first wavelength of electromagnetic radiation.

In yet other embodiments, the optical element may comprise an optical waveguide having a first surface carrying the dichroic mirror and a second surface defining an optical lens. The optical waveguide may comprise glass material, for example.

Another aspect is directed to a method for making an electro-optic device. The method may include coupling a photonic chip having an optical grating at a surface thereof, and an IC together, positioning an optical element to define an optical path above the optical grating, and positioning a dichroic mirror above the optical grating and aligned with the optical path.

DETAILED DESCRIPTION

Figure 1:
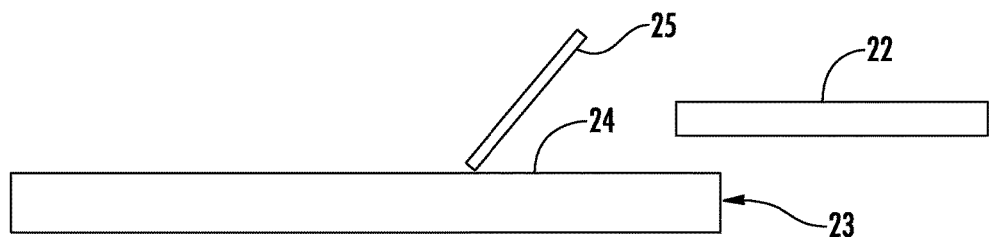
FIGS. 1-2 are schematic side views of an electro-optic device during manufacturing, according to the present disclosure.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
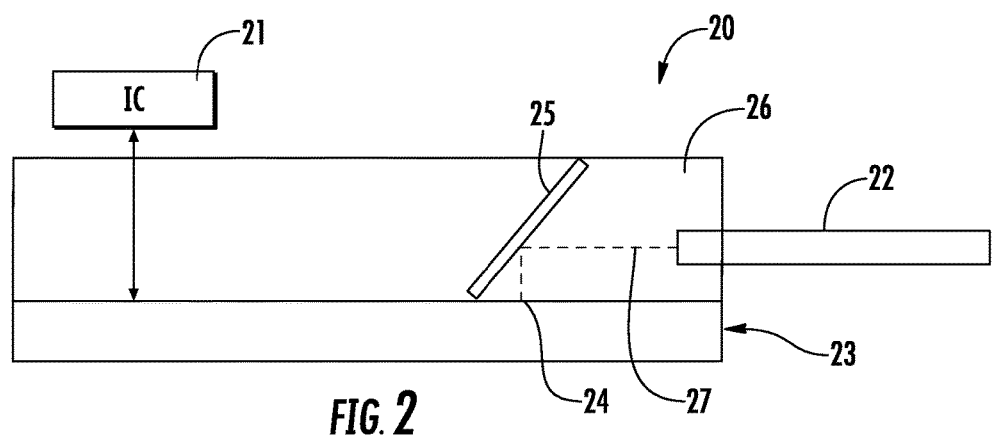

Referring initially to FIGS. 1-2, an electro-optic device 20 illustratively includes a photonic chip 23 having an optical grating (i.e. a diffraction grating) 24 at a surface thereof, and an IC 21 coupled to the photonic chip. The IC 21 may comprise, for example, an electro-optic driver IC. As will be appreciated by the skilled person, the optical grating 24 is formed in a silicon substrate using typical semiconductor fabrication techniques. The photonic chip 23 may comprise a semiconductor substrate, such as a silicon substrate.

The electro-optic device 20 illustratively includes an optical element 22 defining an optical path 27 above the optical grating 24. In the illustrated embodiment, the optical element 22 comprises an optical fiber extending parallel with the optical grating 24. The electro-optic device 20 illustratively includes a dichroic mirror 25 above the optical grating 24 and aligned with the optical path 27. Since the optical grating 24 is on a major surface of the photonic chip 23, the optical path 27 extends largely perpendicular to the major surface (i.e. between 75-90 degrees) and reflects off the dichroic mirror 25.

Also, the electro-optic device 20 illustratively includes a polymer material 26 encapsulating the optical fiber 22 and the dichroic mirror 25. In some embodiments, the polymer material 26 may comprise a photopolymer configured to react to a first wavelength of electromagnetic radiation (e.g. outside the range of 1250-1350 nm). Also, the photonic chip 23 may operate (i.e. be optically transmissive) at a second wavelength of electromagnetic radiation (e.g. 1310 nm, or within the range of 1250-1350 nm), and the dichroic mirror 25 may reflect the second wavelength of electromagnetic radiation and transmit the first wavelength of electromagnetic radiation.

Another aspect is directed to a method for making the electro-optic device 20. The method may include coupling the photonic chip 23 having the optical grating 24 at the surface thereof, and the IC 21 together, positioning the optical element (optical fiber in the illustrated embodiment) 22 to define the optical path 27 above the optical grating, and positioning a dichroic mirror 25 above the optical grating and aligned with the optical path.

In particular, in FIG. 1, the optical fiber 22 and the dichroic mirror 25 are positioned above the photonic chip 23 (e.g. using a carrier substrate and adhesive layers). In FIG. 2, the polymer material 26 is formed to encapsulate the optical fiber 22 and the dichroic mirror 25. The electro-optic device 20 is then irradiated with electromagnetic radiation at the first wavelength, which cures the polymer material 26 and fixes the dichroic mirror 25 and the optical fiber 22 (i.e. a direct write process). Advantageously, because the dichroic mirror 25 transmits the first wavelength of electromagnetic radiation, the entire body of the polymer material is cured, even the portions blocked directly by the dichroic mirror. After curing, the optical path 27 is effected via the dichroic mirror's 25 reflective property for the second wavelength of electromagnetic radiation.

Advantageously, the electro-optic device 20 provides an approach to horizontally coupling the optical fiber 22 with non-active alignment. In typical approaches, direct write manufactured waveguides/lenses required a high contrast between the optical fiber core and cladding to achieve a low bend radius, which may not be possible. This means the overall module height is larger than necessary. Also, in typical approaches where air is used as cladding, the waveguide is exposed and any other encapsulation or environmental contamination (humidity) can alter the optical propagation or reflectivity. With typical approaches that included a mirror, these devices cannot be directly written as the mirror will reflect the laser light used in the writing and the mirror must be attached/deposited afterwards and actively aligned.

Advantageously, the electro-optic device 20 may not need active alignment since the optical waveguides/lens is written with reference to passive (vision recognition) alignment to markers on photonic chip 23. Also, the electro-optic device 20 has a low side profile and avoids dealing with the minimum bending radius for the optical fiber 22. Also, since the dichroic mirror 25 can be encapsulated by the polymer material, the electro-optic device 20 is more mechanically robust than the devices of typical approaches.

Figure 3:
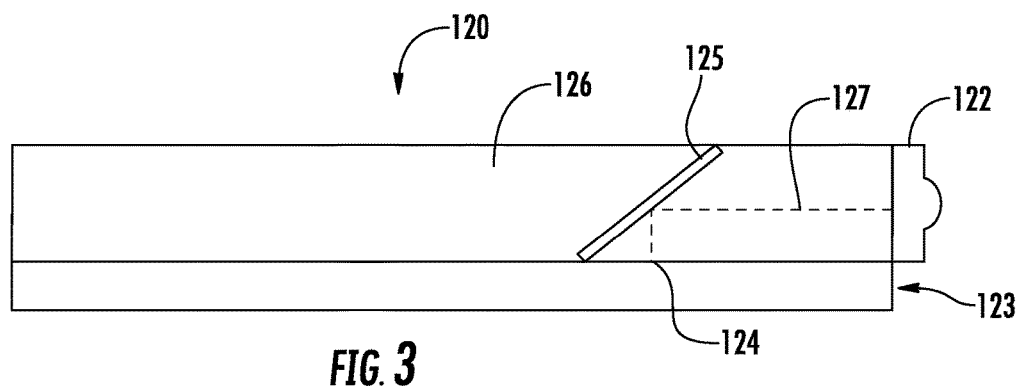
FIG. 3 is a schematic side view of another embodiment of the electro-optic device.

Referring now additionally to FIG. 3, another embodiment of the electro-optic device 20 is now described. In this embodiment of the electro-optic device 20, those elements already discussed above with respect to FIGS. 1-2 are incremented by 100 and most require no further discussion herein. This embodiment differs from the previous embodiment in that this electro-optic device 120 illustratively includes the optical element comprising a window defining a lens 122, i.e. a collimating or a focusing lens. Although the optical fiber 22 of the embodiment of FIGS. 1-2 is omitted for clarity of explanation, the optical fiber can be optically coupled to the output of the lens 122.

Figure 4:
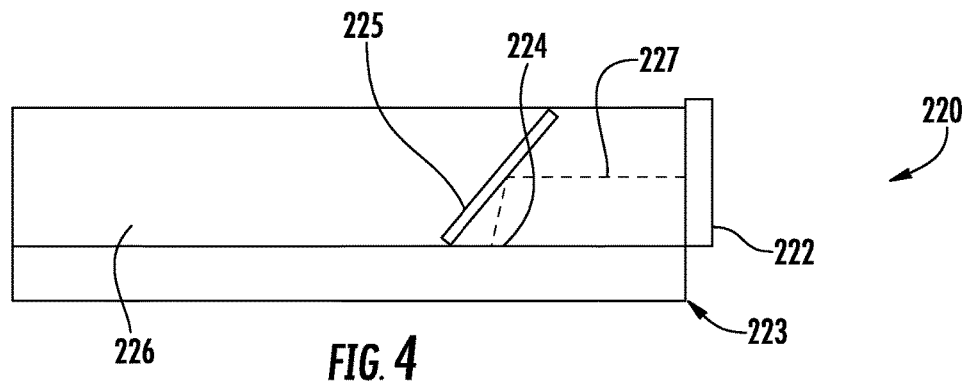
FIG. 4 is a schematic side view of yet another embodiment of the electro-optic device.

Referring now additionally to FIG. 4, another embodiment of the electro-optic device 20 is now described. In this embodiment of the electro-optic device 20, those elements already discussed above with respect to FIGS. 1-2 are incremented by 200 and most require no further discussion herein. This embodiment differs from the previous embodiment in that this electro-optic device 220 illustratively includes the optical element comprising a window 222. Although the optical fiber 22 of the embodiment of FIGS. 1-2 is omitted, the optical fiber can be optically coupled to the output of the window 222.

Figure 5:
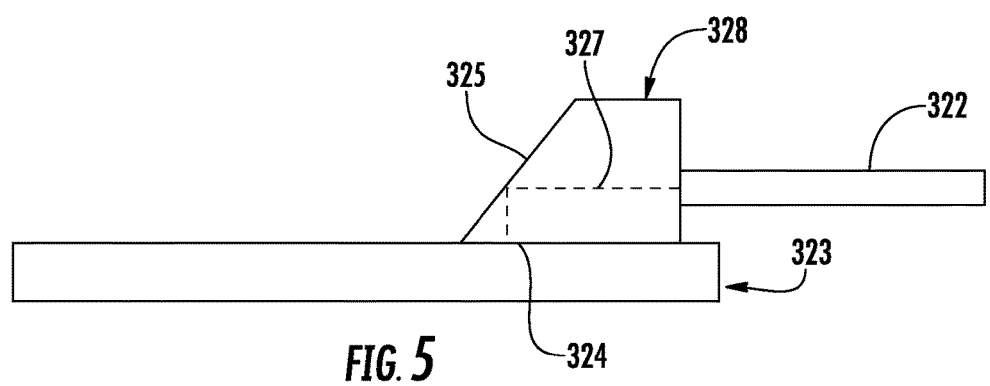
FIG. 5 is a schematic side view of another embodiment of the electro-optic device.

Referring now additionally to FIG. 5, another embodiment of the electro-optic device 20 is now described. In this embodiment of the electro-optic device 20, those elements already discussed above with respect to FIGS. 1-2 are incremented by 300 and most require no further discussion herein. This embodiment differs from the previous embodiment in that this electro-optic device 320 omits the polymer material 26 of the embodiment of FIGS. 1-2. In this embodiment, the optical element comprises an optical fiber 322, and an optical waveguide 328 having a first surface carrying the dichroic mirror 325 and a second surface receiving the optical fiber (in some embodiments, not shown, within a recess). The optical waveguide may comprise glass material, for example. In this embodiment, the optical waveguide 328 is written in situ.

Figure 6:
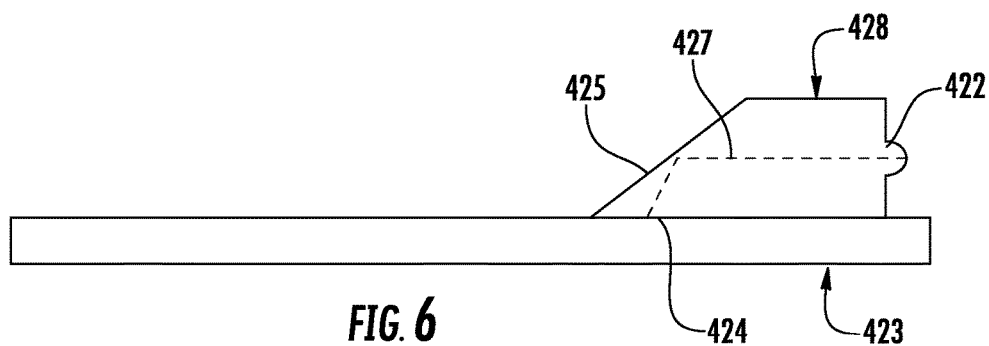
FIG. 6 is a schematic side view of another embodiment of the electro-optic device.

Referring now additionally to FIG. 6, another embodiment of the electro-optic device 20 is now described. In this embodiment of the electro-optic device 20, those elements already discussed above with respect to FIGS. 1-2 are incremented by 400 and most require no further discussion herein. This embodiment differs from the previous embodiment in that this electro-optic device 420 omits the polymer material 26 of the embodiment of FIGS. 1-2. In this embodiment, the optical element comprises an optical waveguide 428 having a first surface carrying the dichroic mirror 425, and a second surface defining an optical lens (e.g. focusing or collimating lens) 422. In this embodiment, the optical waveguide 428 is written in situ.

Figure 7:
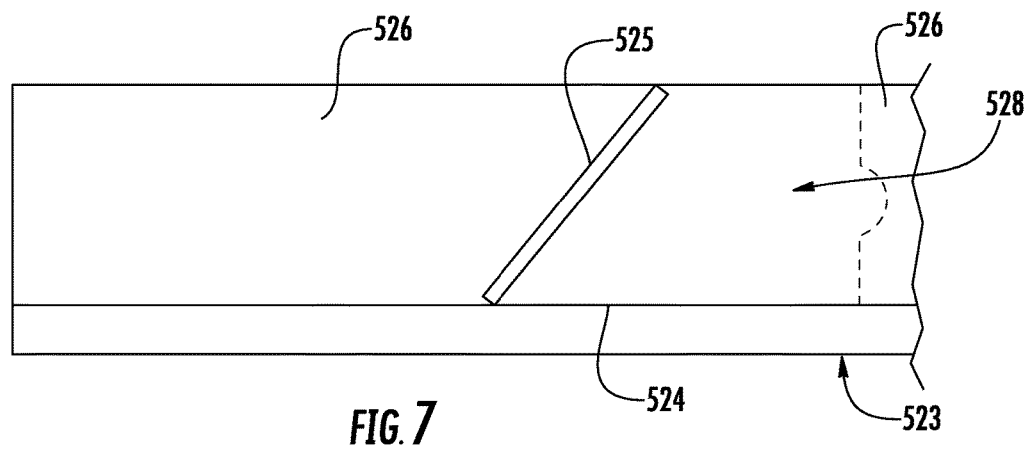
FIGS. 7-8 are schematic side views of another embodiment of the electro-optic device during manufacturing.
Figure 8:
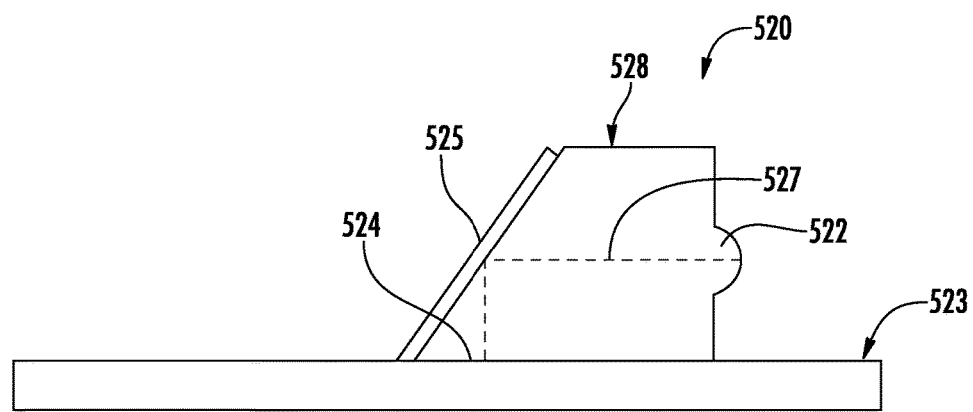

Referring now additionally to FIGS. 7-8, another embodiment of the electro-optic device 20 is now described. In this embodiment of the electro-optic device 20, those elements already discussed above with respect to FIGS. 1-2 are incremented by 500 and most require no further discussion herein. This embodiment differs from the previous embodiment in that this electro-optic device 520 selectively cures the polymer material 526. In particular, the polymer material 526 is selectively (e.g. laser optical source) irradiated/written with electromagnetic radiation at the first wavelength to define an optical waveguide 528. At FIG. 8, the uncured polymer material is removed by applying a solvent, which defines the optical waveguide 528 comprising a lens 522, i.e. a collimating lens.

In this embodiment, the two photon absorption makes it possible to form structures or optical waveguides 528 in the polymer material 526 (i.e. resin), and then remove the excess, leaving just say the lens system or optical waveguide. This structure will then at the boundary have a high reflective index contrast between the material and air. The alternative method is to write the waveguide or structure and leave the unwritten material in place, this may produce structures with low refractive index contrast.

Figure 9:
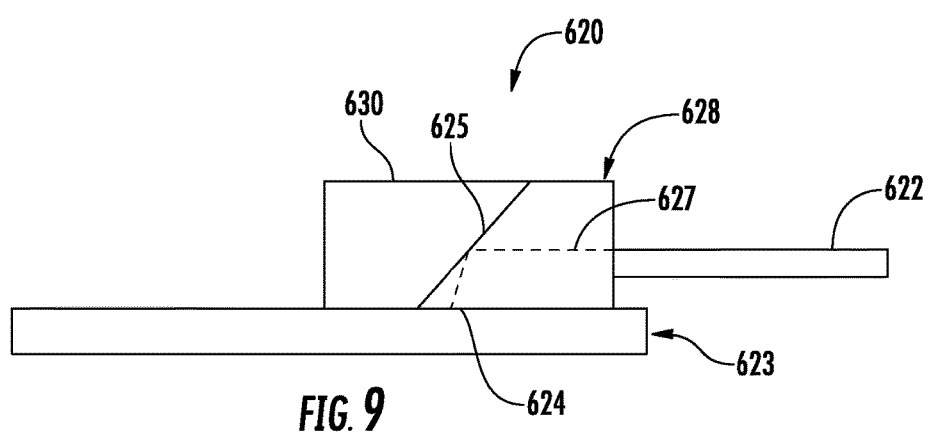
FIG. 9 is a schematic side view of another embodiment of the electro-optic device.

Referring now additionally to FIG. 9, another embodiment of the electro-optic device 20 is now described. In this embodiment of the electro-optic device 20, those elements already discussed above with respect to FIGS. 1-2 are incremented by 600 and most require no further discussion herein. This embodiment differs from the previous embodiment in that this electro-optic device 620 illustratively includes a block 630 comprising the mirror 625. In some embodiments, the mirror 625 may comprise a dichroic mirror. Here, the optical waveguide 628 abuts the block 630. Although not shown, the electro-optic device 620 includes a thin layer of epoxy between the optical waveguide 628 and the block 630. The thin layer of epoxy must be carefully formed so as not to interfere with the reflection of the electromagnetic radiation at the second wavelength. In this embodiment, the optical curing of the optical waveguide 628 would occur before coupling of the block 630.

In this alternative embodiment, as the block 630 containing the mirror 625 is added after the writing of the optical waveguide 628 and/or lens system, the mirror does not need to be dichroic. This alternative embodiment may possibly have the disadvantage in that the additional block is added with epoxy. The thin layer of epoxy may cause variations in the optical path 627 as it is difficult to control precisely. In advantageous dichroic embodiments, the dichroic mirror 625 covers all the material that is exposed by the laser. This is so that there is no abrupt disconnect where the dichroic mirror 625 ends as the mirror (even in transmission), which may cause a shift in the position of the laser beam with respect to air. Accordingly, there will be a "jump" movement of the laser beam as the beam moves across the end of the mirror during the writing. This could in theory be avoided using appropriate software control or more simply by having the mirror cover the entire area written.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A method for making an electro-optic device comprising:
    coupling a photonic chip having an optical grating at a surface thereof with an integrated circuit (IC);
    positioning an optical element defining an optical path above the optical grating;
    positioning a dichroic mirror above the optical grating and aligned with the optical path; and
    curing an entirety of a photopolymer to encapsulate the optical element and the dichroic mirror using a first wavelength of electromagnetic radiation;
    wherein the photonic chip is configured to operate at a second wavelength range of electromagnetic radiation, and the dichroic mirror is configured to reflect the second wavelength range of electromagnetic radiation and transmit the first wavelength of electromagnetic radiation, with the first wavelength being outside the second wavelength range.

2. The method of claim 1 wherein the optical element comprises an optical fiber extending parallel with the optical grating.

3. The method of claim 1 wherein the optical element comprises a lens.

4. The method of claim 3 wherein the lens comprises a collimating lens.

5. The method of claim 3 wherein the lens comprises a flat face lens.

6. The method of claim 3 wherein the lens comprises a partially curved face lens.

7. The method of claim 1 wherein the photopolymer extends along the photonic chip between opposing ends thereof.

8. A method for making an electro-optic device comprising:
    coupling a photonic chip having an optical grating at a surface thereof with an integrated circuit (IC);
    positioning a mirror above the optical grating and aligned with an optical path above the optical grating using an optical waveguide having a first external surface carrying the mirror and a second external surface defining an optical element;
    forming an uncured polymer material over the mirror and the optical element;
    curing, using ultraviolet light, first portions of the uncured polymer material disposed in the optical path and second portions of the uncured polymer material disposed outside the optical path;
    wherein the photonic chip is configured to operate at a wavelength range of electromagnetic radiation, and the mirror is configured to reflect the wavelength range of electromagnetic radiation.

9. The method of claim 8 wherein the optical element comprises a lens.

10. The method of claim 9 wherein the lens comprises a collimating lens.

11. The method of claim 8 further comprising positioning a block abutting the first external surface.

12. The method of claim 8 wherein the mirror comprises a dichroic mirror.

13. A method for making an electro-optic device comprising:
    coupling a photonic chip having an optical grating at a surface thereof with an integrated circuit (IC), wherein the photonic chip is configured to operate at a wavelength range of electromagnetic radiation;
    positioning a mirror above the optical grating and aligned with an optical path above the optical grating, using an optical waveguide having a first external surface carrying the mirror and a second external surface adjacent an optical element; and
    encapsulating the mirror and the optical element in a photo-curable polymer material by curing an entire body of the photo-curable polymer material using a further wavelength range of electromagnetic radiation;
    wherein the mirror is configured to reflect the wavelength range of electromagnetic radiation and transmit the further wavelength range of electromagnetic radiation.

14. The method of claim 13 wherein the optical element comprises an optical fiber extending parallel with the optical grating.

15. The method of claim 13 wherein the optical element comprises a lens.

16. The method of claim 15 wherein the lens comprises a collimating lens.

17. The method of claim 15 wherein the lens comprises a flat face lens.

18. The method of claim 15 wherein the lens comprises a partially curved face lens.

19. The method of claim 13 wherein the mirror comprises a dichroic mirror.

* * * * *